(12) United States Patent
Nishio et al.

(10) Patent No.: US 6,533,368 B2
(45) Date of Patent: Mar. 18, 2003

(54) VEHICLE MOTION CONTROL SYSTEM

(75) Inventors: Akitaka Nishio, Okazaki (JP); Masanobu Fukami, Hazu-gun (JP); Shiro Monzaki, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/962,590

(22) Filed: Sep. 26, 2001

(65) Prior Publication Data

US 2002/0041124 A1 Apr. 11, 2002

(30) Foreign Application Priority Data

Sep. 28, 2000 (JP) .......... 2000-297426
Sep. 28, 2000 (JP) .......... 2000-297427

(51) Int. Cl.[7] .............. B60T 7/12; B60T 8/48
(52) U.S. Cl. ............ 303/140; 303/146; 303/155; 303/114.3
(58) Field of Search ............ 303/140, 139, 303/144, 146, 147, 148, 155, 113.4, 114.3

(56) References Cited

U.S. PATENT DOCUMENTS

| | | | | |
|---|---|---|---|---|
| 5,752,752 A | * | 5/1998 | Tozu et al. ........ | 303/146 |
| 5,762,406 A | * | 6/1998 | Yasui et al. ........ | 303/146 |
| 5,857,754 A | * | 1/1999 | Fukami et al. ...... | 303/146 |
| 6,390,568 B1 | * | 5/2002 | Tozu et al. ........ | 303/140 |

FOREIGN PATENT DOCUMENTS

| | | |
|---|---|---|
| EP | 0 379 329 A2 | 7/1990 |
| JP | 2-241863 A | 9/1990 |

* cited by examiner

*Primary Examiner*—Matthew C. Graham
(74) *Attorney, Agent, or Firm*—Burns, Doane, Swecker & Mathis, LLP

(57) ABSTRACT

The present invention is directed to a vehicle motion control system, which includes wheel brake cylinders, an automatic hydraulic pressure generating apparatus for generating a hydraulic braking pressure irrespective of operation of a brake pedal, a hydraulic pressure control valve device disposed between the pressure generating apparatus and the wheel brake cylinders to control the hydraulic braking pressure in each wheel brake cylinder, and a controller for controlling the pressure generating apparatus and the valve device in response to conditions of vehicle motion, and performing an automatically pressurizing control to the wheel brake cylinders at least when a brake pedal is not depressed, to perform a vehicle motion control. The controller is adapted to maintain the pressure generating apparatus to operate for a predetermined time period after the vehicle motion control was terminated, and control the valve device to shut off the communication between the pressure generating apparatus and the wheel brake cylinders, to modify the time period on the basis of the conditions of vehicle motion.

14 Claims, 8 Drawing Sheets

VEHICLE MOTION CONTROL SYSTEM

This application claims priority under 35 U.S.C. Sec. 119 to No. 2000-297426 and No. 2000-297427 filed in Japan on Sep. 28, 2000, respectively, the entire contents of which are herein incorporated by reference.

BACKGROUND OF THE INVENTION

1. Field of the Invention

The present invention relates to a vehicle motion control system for performing various controls such as a traction control, steering control by braking or the like, particularly relates to the vehicle motion control system having a pressure control valve device disposed between an automatic hydraulic pressure generating apparatus for generating a hydraulic braking pressure irrespective of operation of a brake pedal and each wheel brake cylinder, and controlling the automatic hydraulic pressure generating apparatus in response to the condition of the vehicle motion and controlling the pressure control valve device, to perform an automatically pressurizing control to the wheel brake cylinder.

2. Description of the Related Arts

In Japanese Patent Laid-open Publication No. 2-241863, which corresponds to the European Patent No. EP0379329A2, there is disclosed a fluid-pressure operated booster which is controlled solely by operation of a solenoid-operated valve means in response to a signal from an electric controller, and a vehicle braking system having the booster. In that publication, it is so described that should, for example, a wheel speed sensor emit a signal indicative of a 'wheel-spin' condition then, in a normal inoperative position of the pedal, the controller operates the solenoid-operated valve means independently of the pedal to apply the brake on the spinning wheel.

According to the vehicle control system as disclosed in the above publication, however, a pressurizing condition and a non-pressurizing condition are repeated by automatically pressurizing means such as a booster, whereby its operating sound is made so large as to cause a noise, and energy consumption of the automatically pressurizing means, e.g., vacuum consumption (when the vacuum booster is employed), is made large.

In order to solve the above-described problem, the number of repetition of the operation and non-operation of the automatically pressurizing means can be reduced by delaying the timing for stopping operation of the automatically pressurizing means, and performing a delay control to shut off the communication between the automatically pressurizing means and wheel brake cylinders, and eventually the energy consumption can be reduced. While the delay control is being performed, however, the hydraulic braking pressure is not supplied to the wheel brake cylinders according to the system as disclosed in the above publication. Therefore, it is necessary to provide an immediate action when a brake pedal is depressed during that period.

Preferably, the period for performing the delay control may be adjusted in response to a tendency of initiating the automatically pressurizing control, as it may be adjusted to be long in such a condition that the automatically pressurizing control is likely initiated, otherwise it may be adjusted to be short.

SUMMARY OF THE INVENTION

Accordingly, it is an object of the present invention to provide a vehicle motion control system for performing an automatically pressurizing control to wheel brake cylinders at least when a brake pedal is not depressed, wherein an appropriate delay control is performed in response to a tendency of initiating the automatically pressurizing control, to reduce a noise caused by repetition of a pressurizing condition and a non-pressurizing condition, and reduce energy consumption effectively.

It is another object of the present invention to provide the vehicle motion control system, wherein the noise and energy consumption are reduced effectively, and wherein when the brake pedal is depressed while the automatically pressurizing control is being performed, the hydraulic braking pressure is immediately supplied to the wheel brake cylinders.

In accomplishing the above and other objects, the vehicle motion control system includes wheel brake cylinders which are operatively associated with wheels of the vehicle, respectively, an automatic hydraulic pressure generating apparatus for generating a hydraulic braking pressure irrespective of operation of a brake pedal, a hydraulic pressure control valve device which is disposed between the pressure generating apparatus and the wheel brake cylinders to control the hydraulic braking pressure in each wheel brake cylinder, and a controller which is adapted to control the pressure generating apparatus and the valve device in response to conditions of vehicle motion, and perform an automatically pressurizing control to the wheel brake cylinders at least when a brake pedal is not depressed, thereby to perform a vehicle motion control. The controller is adapted to maintain the pressure generating apparatus to operate for a predetermined time period after the vehicle motion control was terminated, and control the valve device to shut off the communication between the pressure generating apparatus and the wheel brake cylinders, to modify the time period on the basis of the conditions of vehicle motion. Thus, a tendency of initiating the automatically pressurizing control can be determined, so that by adjusting the predetermined time period in response to the conditions of vehicle motion, a delay control can be performed in response to the tendency of initiating the automatically pressurizing control.

In the system as described above, the tendency of initiating the automatically pressurizing control for the traction control and the steering control by braking can be determined especially on the basis of an accelerating condition of the vehicle, out of the conditions of vehicle motion. Therefore, the vehicle motion control system may further comprise an acceleration detection device for detecting the accelerating condition of the vehicle. In this case, the controller may be adapted to modify the time period at least on the basis of the result detected by the acceleration detection device.

Or, the tendency of initiating the automatically pressurizing control for the steering control by braking can be determined especially on the basis of a turning condition of the vehicle, out of the conditions of vehicle motion. Therefore, the vehicle motion control system may further comprise a turning condition detection device for detecting the turning condition of the vehicle. In this case, the controller may be adapted to modify the time period at least on the basis of the result detected by the turning condition detection device.

Furthermore, in the case where the automatic hydraulic pressure generating apparatus includes a vacuum booster, intake vacuum of an engine mounted on the vehicle can be a pressure source for the automatically pressurizing control. When the intake vacuum is relatively large, therefore, a relatively short period of the delay control may be sufficient.

Accordingly, the vehicle motion control system may further comprise a vacuum detection device for detecting the intake vacuum of the engine. In this case, the controller may be adapted to modify the time period at least on the basis of the result detected by the vacuum detection device.

Preferably, the vehicle motion control system includes wheel brake cylinders which are operatively associated with wheels of the vehicle, respectively, an automatic hydraulic pressure generating apparatus for generating a hydraulic braking pressure irrespective of operation of a brake pedal, a hydraulic pressure control valve device which is disposed between the pressure generating apparatus and the wheel brake cylinders to control the hydraulic braking pressure in each wheel brake cylinder, an acceleration detection device for detecting an accelerating condition of the vehicle, a braking operation detection device for detecting a braking operation of the vehicle, and a controller for controlling the pressure generating apparatus and the valve device in response to conditions of vehicle motion, and performing an automatically pressurizing control to the wheel brake cylinders at least when a brake pedal is not depressed, to perform a vehicle motion control. The controller is adapted to maintain the pressure generating apparatus to operate for a predetermined time period after the vehicle motion control was terminated, and control the valve device to shut off the communication between the pressure generating apparatus and the wheel brake cylinders. And, the controller is adapted to control the pressure generating apparatus to be in an inoperative condition thereof, and control the valve device to release the shut-off condition between the pressure generating apparatus and the wheel brake cylinders, in response to a result detected by at least one of the acceleration detection device and the braking operation detection device.

In the above-described vehicle motion control system, preferably, the controller is adapted to make the pressure generating apparatus to be in an operative condition thereof, and control the valve device to shut off the communication between the pressure generating apparatus and the wheel brake cylinders, when the acceleration detection device has detected the acceleration, or when the braking operation detection device has not detected the braking operation, during the predetermined time period after the vehicle motion control was terminated, and the controller is adapted to make the pressure generating apparatus to be in an inoperative condition thereof, and control the valve device to release the shut-off condition between the pressure generating apparatus and the wheel brake cylinders, when the acceleration detection device has not detected the acceleration, or when the braking operation detection device has detected the braking operation, during the predetermined time period after the vehicle motion control was terminated.

In the above-described vehicle motion control system, the pressure generating apparatus may include a master cylinder and a vacuum booster or a hydraulic booster.

BRIEF DESCRIPTION OF THE DRAWINGS

The above stated object and following description will become readily apparent with reference to the accompanying drawings, wherein like referenced numerals denote like elements, and in which.

DESCRIPTION OF THE PREFERRED EMBODIMENTS

Figure 1:
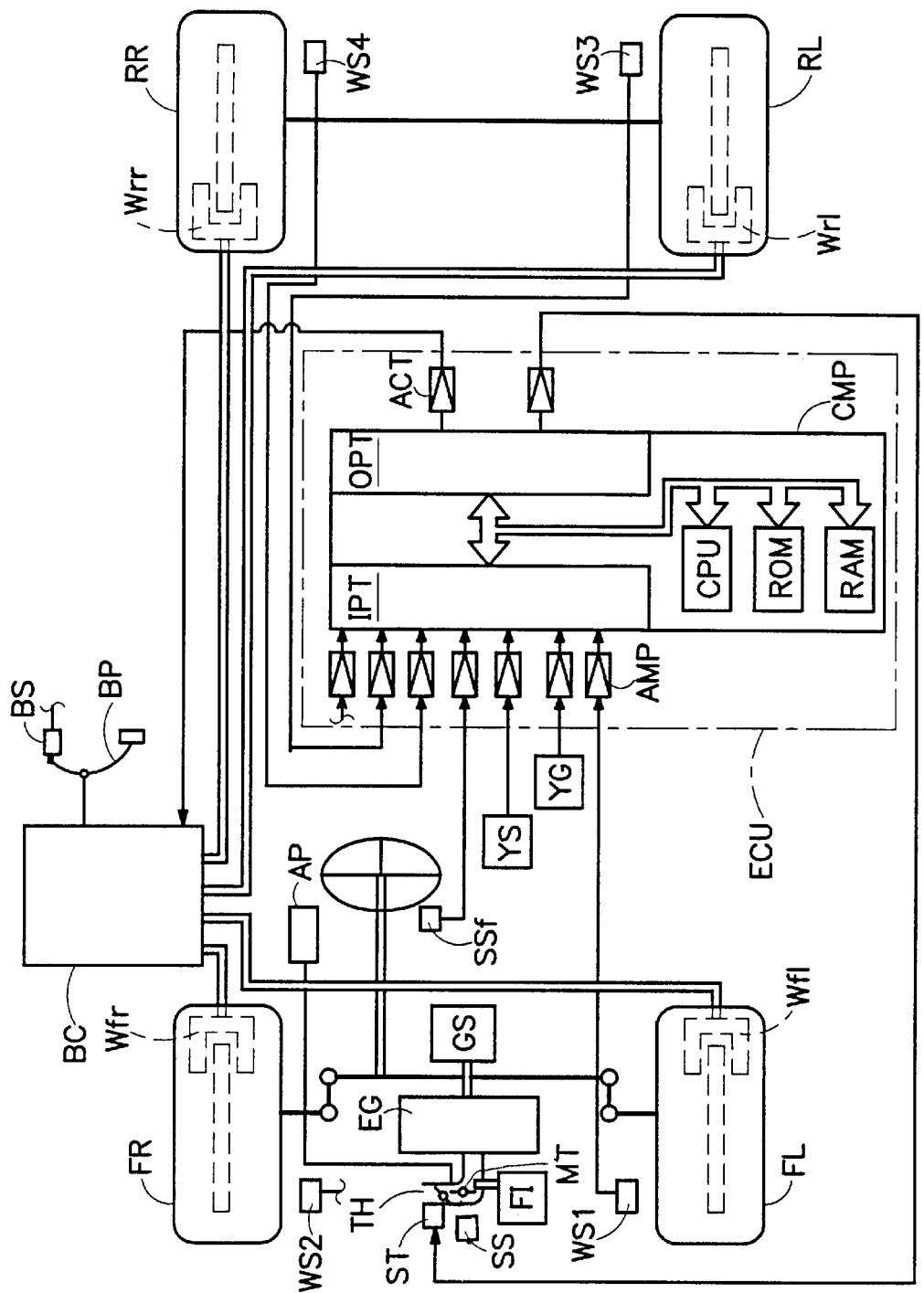
FIG. 1 is a schematic block diagram of a vehicle having a vehicle motion control system according to an embodiment of the present invention.

Referring to FIG. 1, there is schematically illustrated a vehicle having a vehicle motion control system according to the present invention. The vehicle has an engine EG provided with a fuel injection apparatus FI and a throttle control apparatus TH which is arranged to control a main throttle opening of a main throttle valve MT in response to operation of an accelerator pedal AP. The throttle control apparatus TH has a sub-throttle valve ST which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the front wheels FL, FR through a transmission GS to provide a front-drive system, but the present embodiment is not limited to the front-drive system. The wheel FL designates the wheel at the front left side as viewed from the position of a driver's seat, the wheel FR designates the wheel at the front right side, the wheel RL designates the wheel at the rear left side, and the wheel RR designates the wheel at the rear right side.

With respect to a braking system according to the present embodiment, wheel brake cylinders Wfl, Wfr, Wrl, Wrr are operatively associated with the wheels FL, FR, RL, RR of the vehicle, respectively, and which is fluidly connected to a hydraulic braking pressure control apparatus BC. The pressure control apparatus BC in the present embodiment may be arranged as illustrated in FIG. 2 which will be explained later in detail.

As shown in FIG. 1, at the wheels FL, FR, RL and RR, there are provided wheel speed sensors WS1 to WS4 respectively, which are connected to the electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed, and turns off when the brake pedal BP is released, a front steering angle sensor SSf for detecting a steering angle δf of the front wheels FL, FR, a lateral acceleration sensor YG for detecting a vehicle lateral acceleration, a yaw rate sensor YS for detecting a yaw rate of the vehicle, and a throttle sensor SS for detecting opening angles of the main throttle valve MT and sub-throttle valve ST. These are electrically connected to the electronic controller ECU. According to the yaw rate sensor YS, a varying rate of rotational angle of the vehicle about a normal axis on the center of gravity of the vehicle, i.e., a yaw rate angular velocity (yaw rate) is detected, to provide an actual yaw rate γa fed to the electronic controller ECU.

As shown in FIG. 1, the electronic controller ECU is provided with a microcomputer CMP which includes a central processing unit or CPU, a read-only memory or ROM, a random access memory or RAM, an input port IPT, an output port OPT, and the like. The signals detected by the wheel speed sensors WS1 to WS4, brake switch BS, front steering angle sensor SSf, yaw rate sensor YS, lateral acceleration sensor YG and the like are fed to the input port IPT via respective amplification circuits AMP and then to the central processing unit CPU. Then, control signals are fed from the output port OPT to the throttle control apparatus TH and hydraulic braking pressure control apparatus BC via the respective driving circuits ACT. In the microcomputer CMP, the read-only memory ROM memorizes a program corresponding to flowcharts as shown in FIGS. 4 to 7, the central processing unit CPU executes the program while the ignition switch (not shown) is closed, and the random access memory RAM temporarily memorizes variable data needed to execute the program. A plurality of microcomputers may be provided for each control such as throttle control, or may be provided for performing various controls, and electrically connected to each other.

Figure 2:
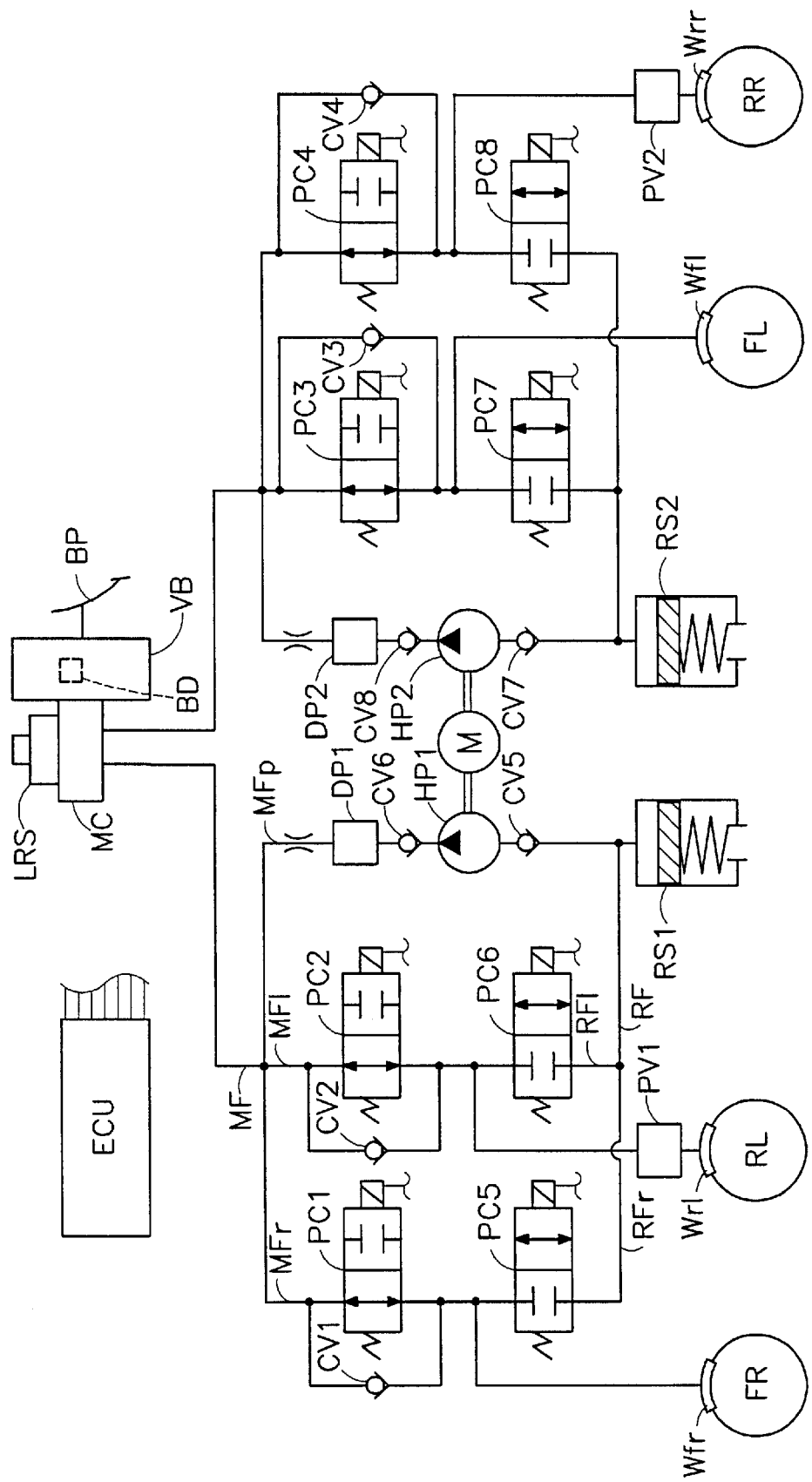
FIG. 2 is a block diagram illustrating a hydraulic braking system according to an embodiment of the present invention.

FIG. 2 shows the hydraulic braking pressure control apparatus BC according to the present embodiment, which includes a master cylinder MC and a vacuum booster VB which are activated in response to operation of the brake pedal BP. The master cylinder MC is boosted by the vacuum booster VB to pressurize the brake fluid in a master-reservoir LRS and discharge the master cylinder pressure to two hydraulic braking pressure circuits for the wheels FR and RL, and the wheels FL and RR, respectively, to provide a so-called diagonal braking circuit system. The master cylinder MC is of a tandem type having two pressure chambers communicated with the two hydraulic braking pressure circuits, respectively. That is a first pressure chamber is communicated with the hydraulic braking pressure circuit for the wheels FR and RL, and a second pressure chamber is communicated with the hydraulic braking pressure circuit for the wheels FL and RR. The vacuum booster VB according to the present embodiment will be described later with reference to FIG. 3.

In the hydraulic braking pressure circuit for the wheels FR and RL, the first pressure chamber is communicated with the wheel brake cylinders Wfr and Wfl, respectively, through a main passage MF and its branch passages MFr, MFl. And, normally open two-port two-position solenoid operated switching valves PC1 and PC2 (hereinafter, simply referred to as solenoid valves PC1 and PC2) are disposed in the branch passages MFr and MFl, respectively. Also, normally closed two-port two-position solenoid operated switching valves PC5 and PC6 (hereinafter, simply referred to as solenoid valves PC5 and PC6) are disposed in the branch passages RFr and RFl, respectively, which merge into the drain passage RF connected to an auxiliary reservoir RS1.

In parallel with the solenoid valves PC1 and PC2, the check valves CV1 and CV2 are provided for allowing the flow of the brake fluid toward the master cylinder MC, and preventing the flow in the wheel brake cylinders Wfr and Wrl. The brake fluid in the wheel brake cylinders Wfr and Wrl is returned to the master cylinder MC, and then to the master-reservoir LRS through the check valves CV1 and CV2. Accordingly, when the brake pedal BP is released, the hydraulic pressure in the wheel brake cylinders Wfr and Wrl can be reduced rapidly to follow the pressure reduced in the master cylinder MC.

In the hydraulic braking pressure circuit for the wheels FR and RL, a hydraulic pressure pump HP1 is disposed in a passage MFp connected to the branch passages MFr and MFl at the upstream of the solenoid valves PC1 and PC2, and its inlet port is connected to the auxiliary reservoir RS1 through a check valve CV5. The pressure pump HP1 and a pressure pump HP2 are driven by a single electric motor M to introduce the brake fluid from the inlets, pressurize the brake fluid to a predetermined pressure, and discharge it from the outlets. The reservoir RS1 is disposed independently from the master-reservoir LRS of the master cylinder MC, and provided with a piston and a spring to function as an accumulator for storing a necessary volume of the brake fluid for various controls as described later.

An outlet of the pressure pump HP1 is connected to the solenoid valves PC1 and PC2 through a check valve CV6 and a damper DP1. The check valve CV5 is provided for preventing the flow of the brake fluid toward the reservoir RS1 and allowing the reverse flow. The check valve CV6 is provided for restricting the flow of the brake fluid discharged from the pressure pump HP1 to a predetermined direction, and normally formed within the pressure pump HP1 in a body. The damper DP1 is disposed at the outlet side of the pressure pump HP1, and a proportioning valve PV1 is disposed in a passage connected to the rear wheel brake cylinder Wrl.

In the hydraulic braking pressure circuit for the wheels FL and RR, are disposed normally open two port two-position solenoid operated switching valves PC3 and PC4, normally closed two port two-position solenoid operated switching valves PC7 and PC8, check valves CV3, CV4, CV7 and CV8, a reservoir RS2, a damper DP2, and a proportioning valve PV2. The pressure pump HP2 is driven by the motor M, together with the pressure pump HP1. The pressure control valve device according to the present invention is constituted by the solenoid valves PC1–PC8, which are controlled by the electronic controller ECU to perform the various controls such as the steering control by braking.

Figure 3:
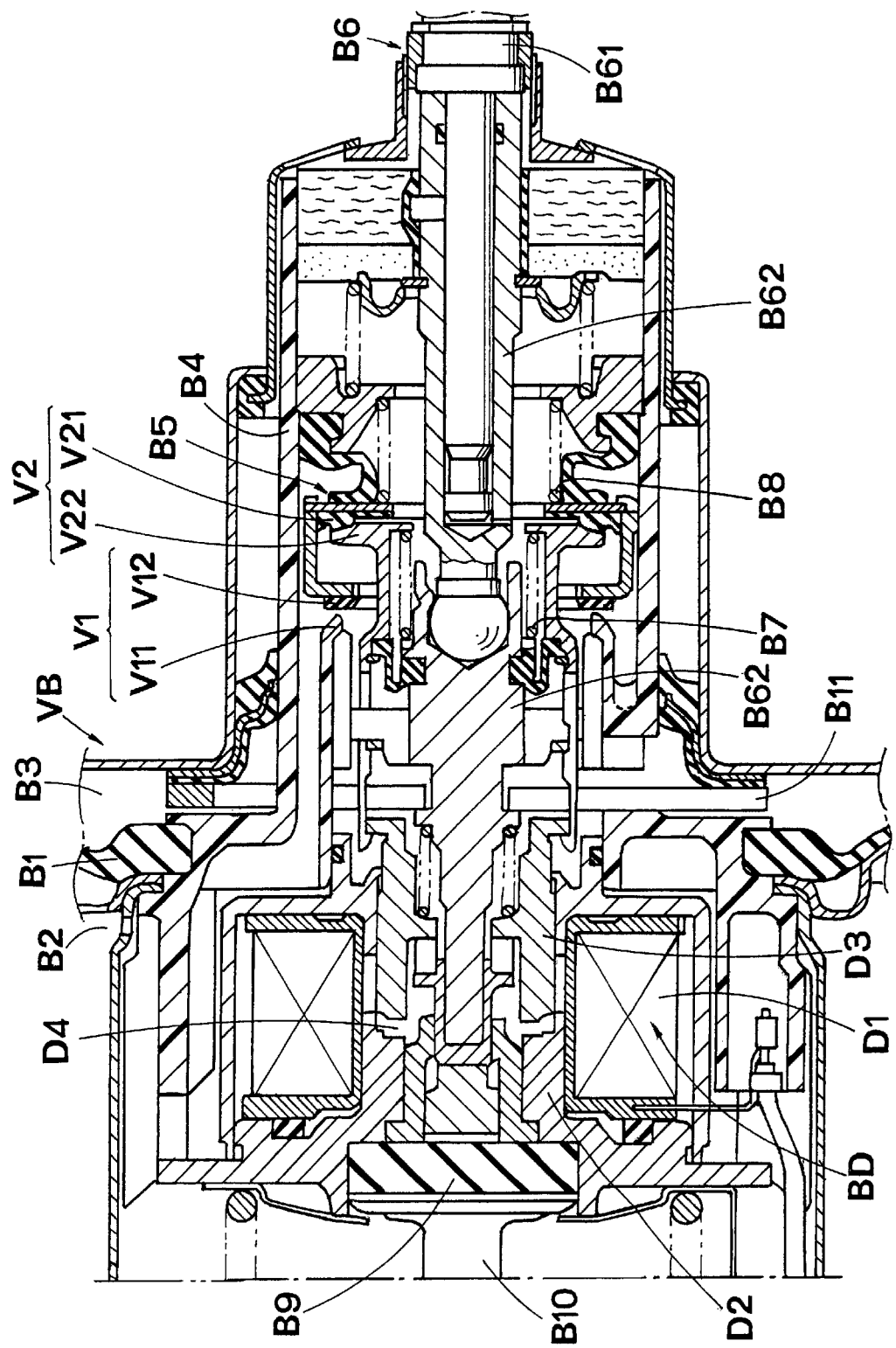
FIG. 3 is a sectional view showing a part of a vacuum booster according to an embodiment of the present invention.

The vacuum booster VB according to the present embodiment is constituted as shown in FIG. 3, wherein a booster driving device BD is provided for automatically driving a vacuum booster VB at least when a brake pedal is not being operated. The basic structure of the vacuum booster VB is substantially the same as the prior one that has a constant pressure chamber B2 and a variable pressure chamber B3 separated by a movable wall B1 which is integrally connected to a power piston B4. The constant pressure chamber B2 is always communicated with an intake manifold (not shown) of the engine EG to introduce intake vacuum (i.e., negative pressure) into the chamber B2. The power piston B4 is connected to an output rod B10 so as to enable the force to be transmitted, through a fixed core D2 and a reaction disk B9 which will be described later, and the output rod B10 is connected to the master cylinder MC.

In the power piston B4, is operatively disposed a valve mechanism B5 which includes a vacuum valve V1 for communicating the constant pressure chamber B2 with the variable pressure chamber B3, or blocking the communication between them, and an air valve V2 for communicating the variable pressure chamber B3 with the atmosphere, or blocking the communication between them. The vacuum valve V1 includes an annular valve seat V11 formed on the power piston B4, and a resilient valve member V12 to be seated on the valve seat V11 or moved away therefrom. The air valve V2 includes a resilient valve seat V21 mounted on the resilient valve member V12, and a valve member V22 to be seated on the valve seat V21 or moved away therefrom. The valve member V22 is connected to an input rod B6 which is movable in response to operation of the brake pedal BP, and urged to be seated on the resilient valve seat V21 by a biasing force of a spring B7. And, by means of biasing force of a spring B8, the resilient valve member V12 of the vacuum valve V1 is urged to be seated on the annular valve seat V11, and the resilient valve seat V21 of the air valve V2 is urged to seat thereon the valve member V22. Accordingly, in response to operation of the brake pedal BP (FIG. 2), the vacuum valve V1 and air valve V2 of the valve mechanism B5 are opened or closed, so that a pressure difference is produced between the constant pressure chamber B2 and the variable pressure chamber B3 in response to the operating force of the brake pedal BP, whereby an output force, which is increased in response to operation of the brake pedal BP, is transmitted to the master cylinder MC.

The booster driving device BD includes a solenoid D1, the fixed core D2 and the movable core D3. The solenoid D1 is the one for attracting the movable core D3 toward the fixed core D2 when energized, and electrically connected to the electronic controller ECU as shown in FIG. 1. The fixed core D2 is disposed between the power piston B4 and the reaction disk B9, so that the force can be transmitted from the power piston B4 to the reaction disk B9. A movable core D3 is disposed to oppose with the fixed core D2 within the solenoid D1, to form a magnetic gap D4 between the movable core D3 and the fixed core D2. The movable core D3 is engaged with the valve member V22 of the air valve V2, and so constituted that the valve member V22 of the air valve V2 is moved together, when the movable core D3 is moved relative to the fixed core D2 to reduce the magnetic gap D4. The input rod B6 includes a first input rod B61 and a second input rod B62. The first input rod B61 is connected to the brake pedal BP in a body, while the second input rod B62 is movable relative to the first input rod B61, so that it is so constituted that the force can be transmitted by the power piston B4 to the output rod B10 through a key member B11. Therefore, when only the second input rod B62 is moved forward, the first input rod B61 is remained. Thus, the first and second input rods B61 and B62 constitute a so-called pedal remaining system.

Accordingly, the vacuum booster VB (including the booster driving device BD) and the master cylinder MC constitute the automatic hydraulic pressure generating apparatus according to the present invention. The operation of the vacuum booster VB or the like, which is performed in the case where the automatically pressurizing control (e.g., steering control by braking or traction control) is performed with respect to the wheel to be controlled, at least when the brake pedal is not operated, will be explained hereinafter.

When the automatically pressurizing control is initiated by the electronic controller ECU, the solenoid D1 is energized to move the movable core D3 toward the magnetic gap D4, so that the valve member V22 of the air valve V2 is moved integrally with the movable core D3 against the biasing force of the spring B7. As a result, the resilient valve member V12 of the vacuum valve V1 is seated on the annular valve seat V11 by the spring B8 to shut off the communication between the variable pressure chamber B3 and the constant pressure chamber B2. Thereafter, the valve member V22 of the air valve V2 is moved further, so that the valve body V22 is moved away from the resilient valve seat V21, to introduce the atmospheric air into the variable pressure chamber B3. Accordingly, the pressure difference is produced between the variable pressure chamber B3 and the constant pressure chamber B2, to advance the power piston B4, fixed core D2, reaction disk B9 and output rod B10 toward the master cylinder MC (FIG. 2). As a result, the hydraulic braking pressure is automatically output from the master cylinder MC. Then, after the power piston B4 is engaged with the key member B11, the second input rod B62, which is engaged with the key member B11, is advanced together with the power piston B4. In this case, the advancing force of the power piston B4 is not transmitted to the first input rod B61, so that the initial position is maintained. That is, while the vacuum booster VB is being driven by the booster driving device BD, the brake pedal BP is maintained in its initial position.

Figure 4:
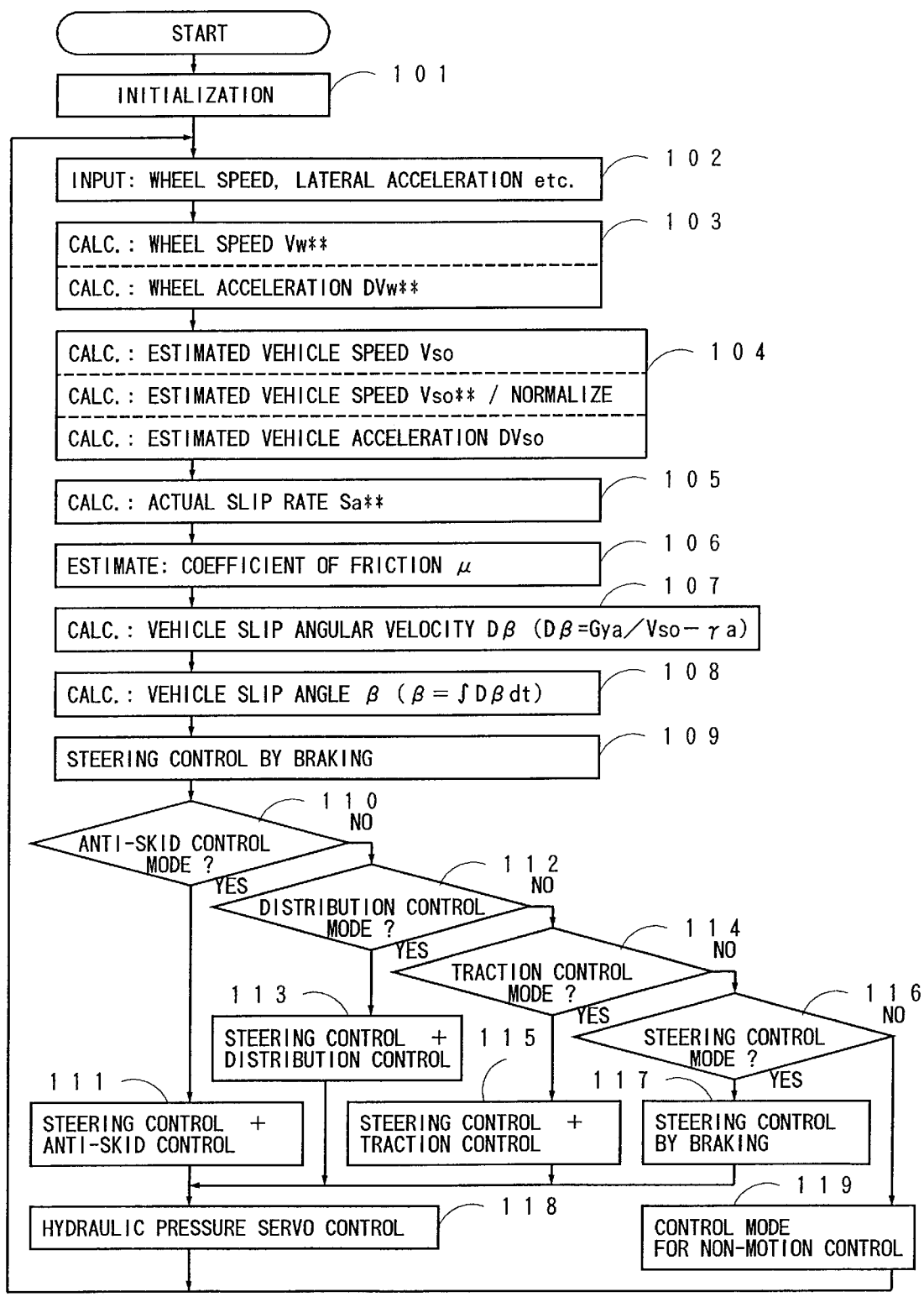
FIG. 4 is a flowchart showing a main routine of a vehicle motion control according to an embodiment of the present invention.

The booster driving device BD, solenoid valves PC1–PC8 and the motor M are controlled by the electronic controller ECU to perform the steering control by braking (over steering control restraining control, or under steering restraining control) or the like. When an ignition switch (not shown) is turned on, the program of the motion control corresponding to the flowchart as shown in FIG. 4 will be performed at 6-millisecond operation period. At the outset, the program provides for initialization of the system at Step 101 to clear various data. Then, at Step 102, the signals detected by the wheel speed sensors WS1 to WS4 are read by the electronic controller ECU, and also read are the signal (steering angle $\delta f$) detected by the front steering angle sensor SSf, the signal (actual yaw rate $\gamma a$) detected by the yaw rate sensor YS, the signal (actual lateral acceleration Gya) detected by the lateral acceleration sensor YG and the signal detected by the throttle sensor SS or the like.

Then, the program proceeds to Step 103 where the wheel speed Vw ( represents one of the wheels FL, FR, RL, RR) of each wheel is calculated, and differentiated to provide the wheel acceleration DVw. At Step 104, the maximum of the wheel speeds Vw for four wheels is calculated to provide an estimated vehicle speed Vso on a gravity center of the vehicle (Vso=MAX[Vw]), and an estimated vehicle speed Vso is calculated for each wheel, respectively, on the basis of the wheel speed Vw. The estimated vehicle speed Vso may be normalized to reduce the error caused by a difference between the wheels located on the inside and outside of the curve while cornering. Furthermore, the estimated vehicle speed Vso is differentiated to provide an estimated vehicle acceleration (including an estimated vehicle deceleration with opposite sign) DVso on the gravity center of the vehicle. At Step 105, also calculated is an actual slip rate Sa on the basis of the wheel speed Vw for each wheel and the estimated vehicle speed Vso (or, the estimated and normalized vehicle speed) which are calculated at Steps 103 and 104**, respectively, in accordance with the following equation:

$$Sa^{}=(Vso^{}-Vw^{})/Vso^{}$$

Then, at Step 106, on the basis of the vehicle acceleration DVso on the gravity center of the vehicle and the actual lateral acceleration Gya detected by the lateral acceleration sensor YG, the coefficient of friction $\mu$ against a road surface can be calculated in accordance with the following equation:

$$\mu=(DVso^2+Gya^2)^{1/2}$$

In order to detect the coefficient of friction against the road surface, various methods may be employed other than the above method, such as a sensor for directly detecting the coefficient of friction against the road surface.

Then, the program proceeds to Steps 107 and 108, where a vehicle slip angular velocity Dβ is calculated, and a vehicle slip angle β is calculated. This vehicle slip angle β is an angle which corresponds to a vehicle slip against the vehicle's path of travel, and which can be estimated as follows. That is, at the outset, the vehicle slip angular velocity Dβ, which is a differentiated value dβ/dt of the vehicle slip angle β, is calculated at Step 107 in accordance with the following equation:

$$D\beta = Gya/Vso - \gamma a$$

Then, the vehicle slip angle β is calculated at Step 108 in accordance with the following equation:

$$\beta = \int (Gya/Vso - \gamma a) dt$$

The program further proceeds to Step 109 where a control mode for the steering control by braking is set to provide a desired slip rate for use in the steering control by braking, and the braking torque applied to each wheel is controlled through the hydraulic pressure servo control at Step 118. The steering control by braking is to be added to each control performed in all the control modes as described later. Then, the program proceeds to Step 110, where it is determined whether the condition for initiating the anti-skid control is fulfilled or not. If it is determined that the condition is in the anti-skid control mode, the program proceeds to Step 111, where a control mode performing both the steering control by braking and the anti-skid control start.

If it is determined at Step 110 that the condition for initiating the anti-skid control has not been fulfilled, then the program proceeds to Step 112 where it is determined whether the condition for initiating the front and rear braking force distribution control is fulfilled or not. If the result is affirmative at Step 112, the program further proceeds to Step 113 where a control mode for performing both the steering control by braking and the braking force distribution control is performed, otherwise it proceeds to Step 114, where it is determined whether the condition for initiating the traction control is fulfilled or not. If the condition for initiating the traction control is fulfilled, the program proceeds to Step 115 where a control mode for performing both the steering control by braking and the traction control is performed. Otherwise, the program proceeds to Step 116 where it is determined whether the condition for initiating the steering control by braking is fulfilled or not. If the condition for initiating the steering control by braking is fulfilled, the program proceeds to Step 117 where a control mode for performing only the steering control by braking is set. On the basis of the control modes as set in the above, the hydraulic pressure servo control is performed at Step 118, and then the program returns to Step 102. In the mean time, according to the braking force distribution control mode, the distribution of the braking force applied to the rear wheel relative to that applied to the front wheel is controlled to maintain the stability of the vehicle when braking the vehicle. If it is determined at Step 116 that the condition for initiating the steering control by braking has not been fulfilled, the program proceeds to Step 119 where a control mode for non-motion control, which will be described later, is set, and then the program returns to Step 102. In accordance with the control modes set at Steps 111, 113, 115 and 117, the sub-throttle opening angle for the throttle control apparatus TH may be adjusted in response to the conditions of vehicle motion, so that the output of the engine EG could be reduced to limit the driving force produced thereby.

Next, referring to FIG. 5, will be explained operation of the mode for non-motion control as provided at Step 119 in FIG. 4. At Step 201, is set a delay time "Td", which is a period from the time when the automatically pressurizing control performed by the automatic hydraulic pressure generating apparatus according to the present invention became unnecessary, to the time when operation of the pressure generating apparatus was actually terminated, and which is set in accordance with a flow chart as shown in FIG. 6. Then, it is determined at Step 202 whether the delay time (Td) has elapsed or not, after the automatically pressurizing control was performed. If it is determined that the delay time (Td) has not elapsed, the program further proceeds to Step 203, where an accelerated amount (e.g., acceleration angle) is compared with a predetermined value "Ka". When it is determined that the accelerated amount is equal to or greater than the predetermined value (Ka), i.e., it is determined that the accelerator pedal AP is being depressed, the program further proceeds to Step 204, where it is determined whether the brake switch BS is on or off. If the brake switch BS is off, the program proceeds to Step 205 where the booster driving device BD is operated, and all of the wheels are set for the hold mode at Step 206. That is, all of the normally-open solenoid valves PC1–PC4 are closed, to shut off the communication between the master cylinder MC and all of the wheel brake cylinders.

On the contrary, if it is determined at Step 202 that the delay time (Td) has elapsed, the program proceeds to Step 207, where the booster driving device BD is made to be inoperative, and the pressure increase mode is set for all of the wheels at Step 208. Thus, by employing the delay time Td, the number of operation and non-operation of the vacuum booster VB is reduced. Consequently, the noise, which is caused by a repetition of pressurizing condition and non-pressurizing condition when the automatically pressurizing control is performed, can be reduced, and the vacuum consumption can be reduced.

Also, if it is determined at Step 203 that the accelerated amount is less than the predetermined value (Ka), i.e., it is determined that the accelerator pedal AP is not depressed, the program proceeds to Step 207, where the booster driving device BD is made to be inoperative, and the pressure increase mode is set for all of the wheels at Step 208. Thus, even if the delay time (Td) has not elapsed, when it is determined that the accelerator pedal AP is not depressed, the booster driving device BD is made to be inoperative, and the pressure increase mode is set for all of the wheels. Therefore, when the braking operation is made during the automatically pressurizing control, the ordinary braking operation can be performed immediately.

Furthermore, when it is determined at Step 204 that the brake switch BS is turned on, i.e., the brake pedal BP is operated, the program proceeds to Step 207, where the booster driving device BD is made to be inoperative, and the pressure increase mode is set for all of the wheels at Step 208. Thus, even if the delay time (Td) has not elapsed, when it is determined that the brake pedal BP is depressed, the booster driving device BD is made to be inoperative, and the pressure increase mode is set for all of the wheels, so that it can be shifted to the ordinary braking operation immediately.

Figure 5:
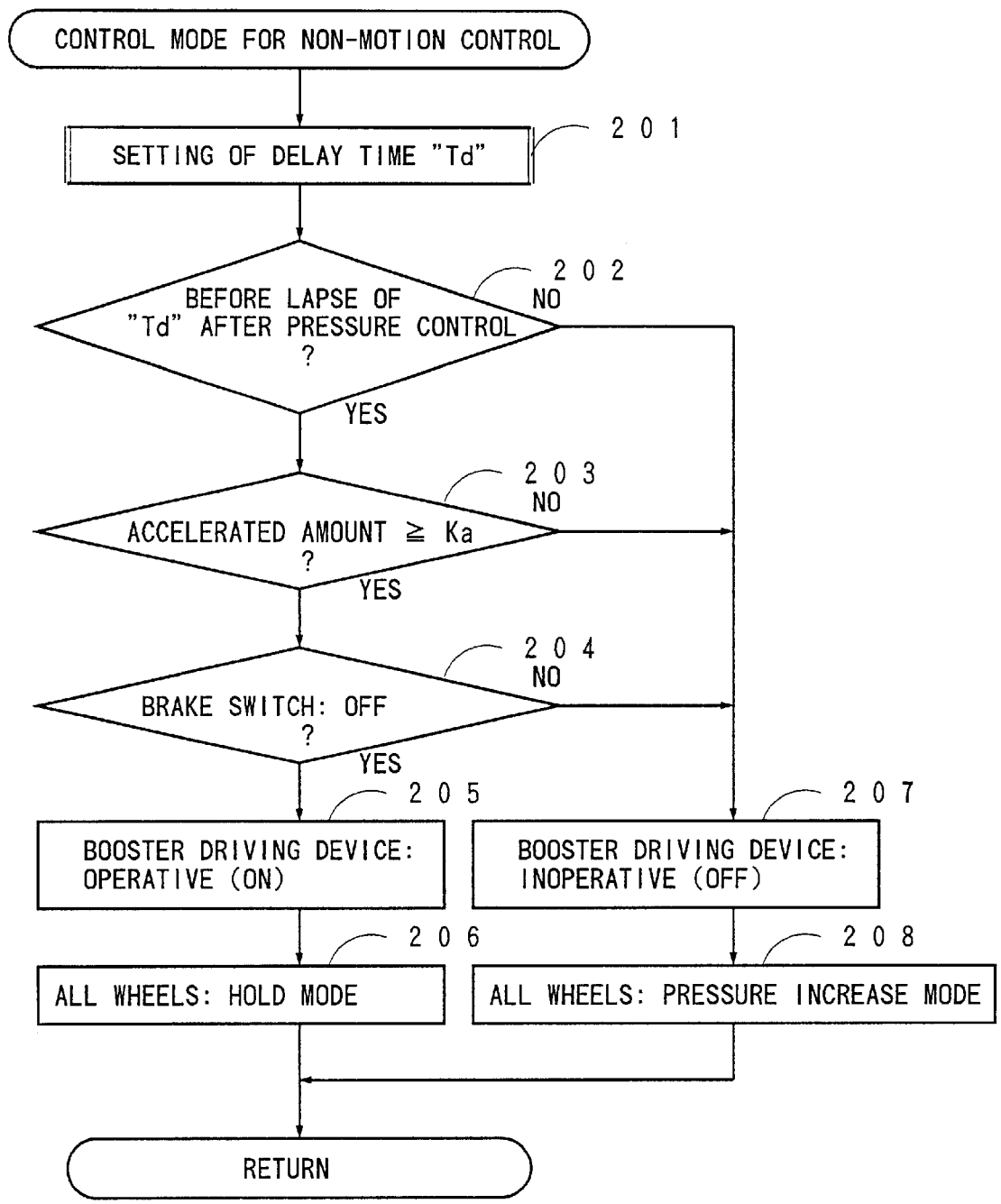
FIG. 5 is a flowchart showing a subroutine of a control mode for a non-motion control according to an embodiment of the present invention.
Figure 6:
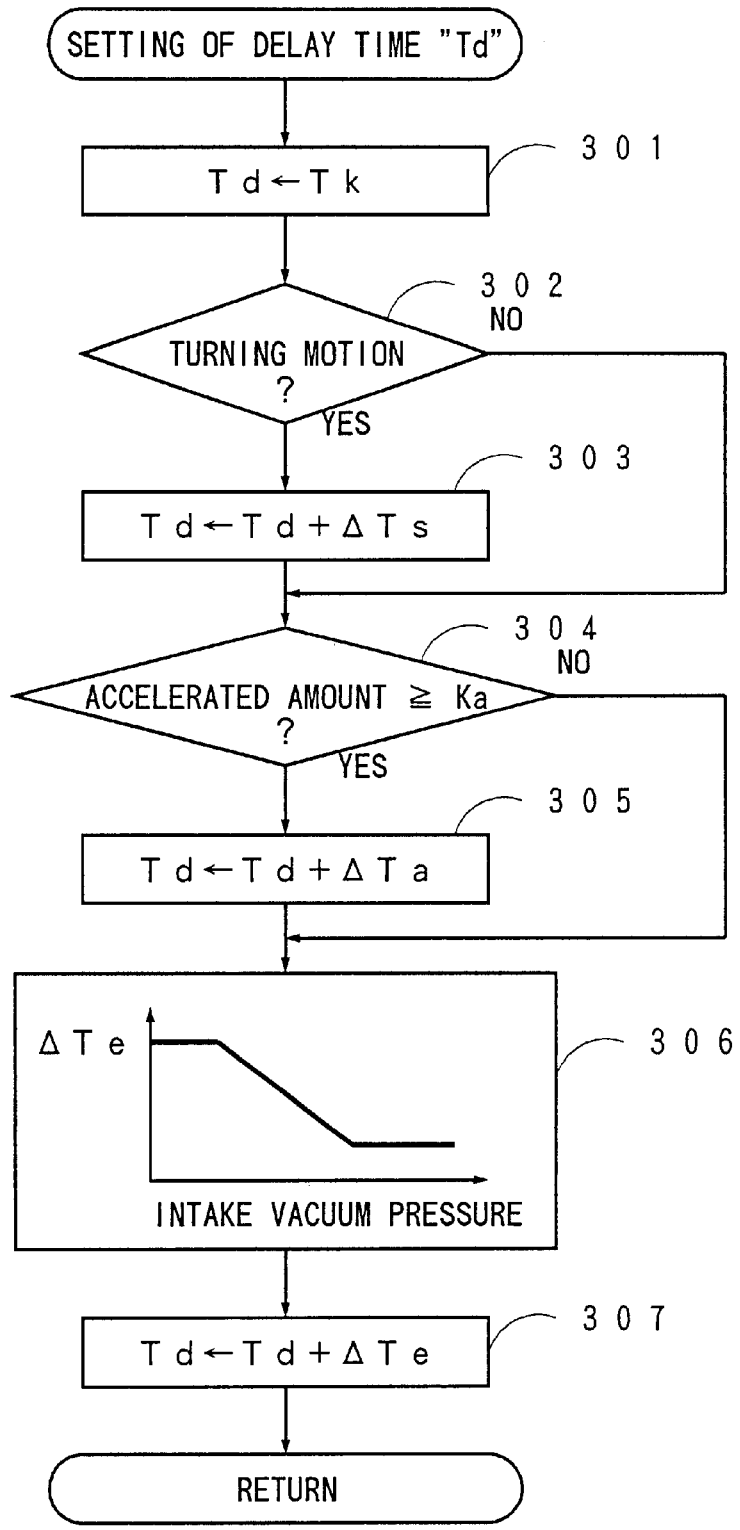
FIG. 6 is a flowchart showing a subroutine for setting a delay time (Td) according to an embodiment of the present invention.
Figure 7:
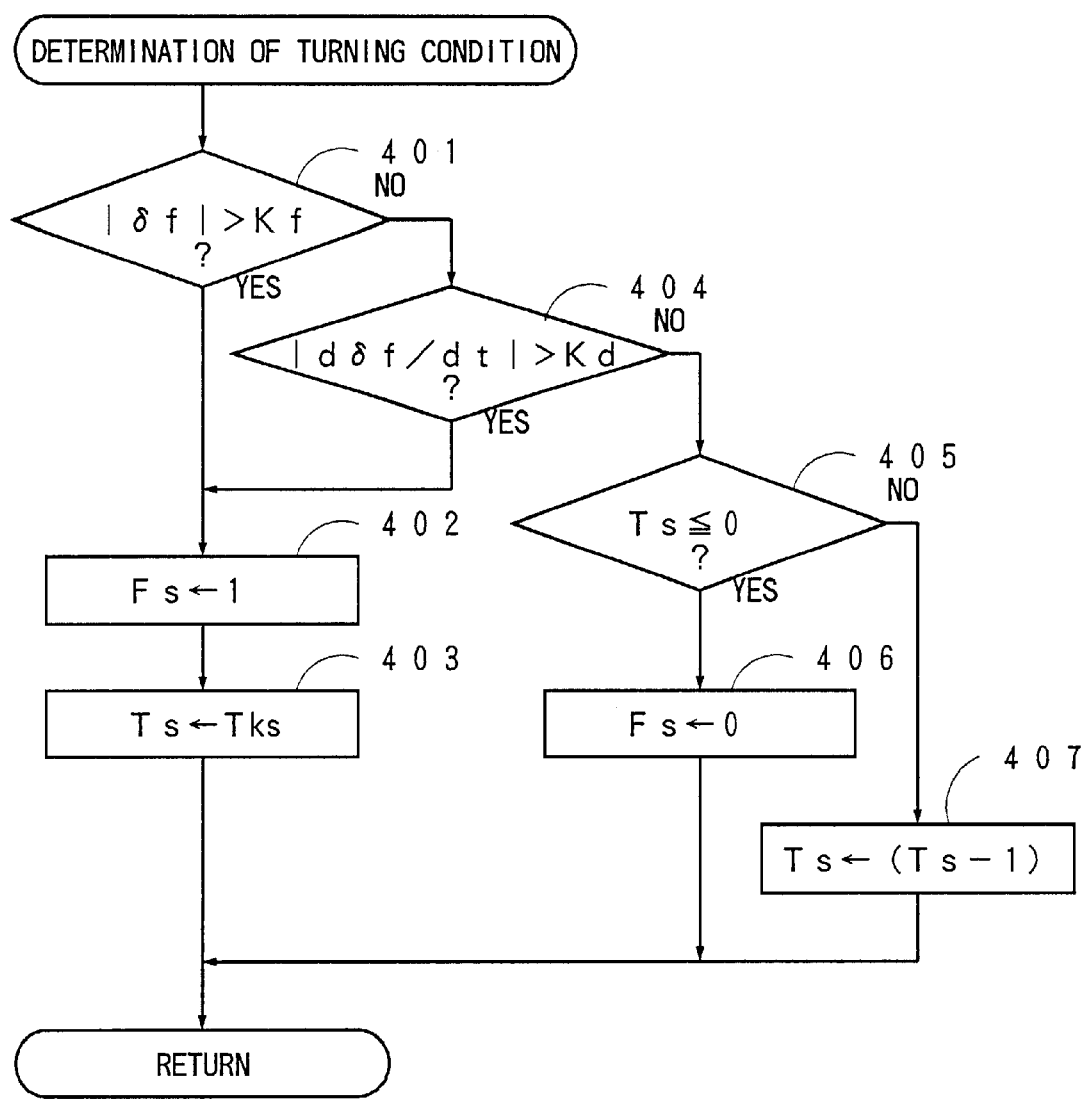
FIG. 7 is a flowchart showing an example of determining a turning condition of the vehicle according to an embodiment of the present invention.

FIG. 6 shows a sub-routine of setting the delay time (Td) executed at Step 201 in FIG. 5. At Step 301, a predetermined reference time (Tk) is set as the delay time (Td). Then, a turning condition of the vehicle is determined at Step 302. In practice, the steering angle δf of the front wheels FL, FR is detected by the front steering angle sensor SSf as shown in FIG. 1, so that the turning condition of the vehicle is determined on the basis of the detected steering angle δf according to a flowchart as shown in FIG. 7 for example, which will be described later. The turning condition of the vehicle may be determined on the basis of the result detected by the yaw rate sensor YS or the lateral acceleration sensor YG. In the case where it is determined at Step 302 that the vehicle is under its turning motion, the automatically pressurizing control for the steering control by braking is likely to be initiated. In this case, therefore, the program proceeds to Step 303 where a modifying time (ΔTs) is added to the delay time (Td), to prolong the delay time (Td), and then the program proceeds to Step 304. On the contrary, if it is determined at Step 302 that the vehicle is not under its turning motion, the program proceeds from Step 302 to Step 304.

At Step 304, the accelerated amount (e.g., acceleration angle) operated by the accelerator pedal AP is compared with the predetermined value (Ka). When it is determined that the accelerated amount is equal to or greater than the predetermined value (Ka), i.e., it is determined that the accelerator pedal AP is being operated and its operated amount is equal to or greater than the predetermined value (Ka), the program further proceeds to Step 305, where a modifying time (ΔTa) is added to the delay time (Td), to prolong the delay time (Td), and then the program proceeds to Step 306. On the contrary, if it is determined at Step 305 that the accelerated amount is less than the predetermined value (Ka), the program proceeds from Step 304 to Step 306. With respect to the accelerated amount, the depressed amount or depressed speed of the accelerator pedal AP can be used, so that the operated amount or operated speed of the accelerator pedal AP may be detected directly. Or, the throttle angle may be detected by the throttle sensor, so that the accelerated amount may be estimated on the basis of the detected throttle angle.

At Step 306, the intake vacuum of the engine EG mounted on the vehicle is detected. In response to the detected result, a modifying time (ΔTe) is set on the basis of a map as shown in Step 306 of FIG. 6. Then, the program further proceeds to Step 307, where the modifying time (ΔTe) is added to the delay time (Td), to prolong the delay time (Td), and then the program returns to the routine as shown in FIG. 5. That is, in the case where the automatic hydraulic pressure generating apparatus includes the vacuum booster VB as in the present embodiment, the intake vacuum is used as a pressure source for the automatically pressurizing control. Therefore, when the intake vacuum (negative pressure) is small, a relatively long delay time will be needed, whereas when the intake vacuum is large, a relatively short delay time will be sufficient. Accordingly, the modifying time (ΔTe) is set in such a manner that the larger the intake vacuum (negative pressure) becomes, the shorter the modifying time (ΔTe) is set. With respect to the vacuum detection device, a vacuum sensor (not shown) for directly detecting the intake vacuum may be used. Or, it may be so constituted that the intake vacuum is estimated on the basis of the wheel speeds detected by the wheel speed sensors WS1–WS4, a vehicle speed estimated on the basis of the detected wheel speeds, and the result detected by a rotational speed sensor (not shown) for detecting the rotational speed of the engine EG.

According to the present embodiment, all of Steps 302, 304 and 306 are executed, so that the delay time (Td) is modified by adding the modifying times (ΔTs, ΔTa, ΔTe) to the reference time (Tk). However, one or two of the modifying times (ΔTs, ΔTa, ΔTe) may be added to the reference time (Tk), to modify the delay time (Td).

FIG. 7 shows a sub-routine of determining the turning condition of the vehicle executed at Step 302 in FIG. 6. At Step 401, an absolute value of the steering angle (δf) detected by the front steering angle sensor SSf is compared with a predetermined value (Kf). If the absolute value of the steering angle (δf) is greater than the predetermined value (Kf), it is determined that the vehicle is in the turning motion thereof, so that a turning flag Fs is set to be one (1) at Step 402, and the timer (Ts) is set to be a predetermined time (Tks) at step 403, then the program returns to the routine in FIG. 6. If it is determined at Step 401 that the absolute value of the steering angle (δf) is equal to or less than the predetermined value (Kf), the program further proceeds to step 404, where an absolute value of differentiated value (dδf/dt) is compared with a predetermined value (Kd). If it is determined that the absolute value of differentiated value (dδf/dt) is greater than the predetermined value (Kd), the program proceeds to Step 402 where the turning flag Fs is set. In the case where the absolute value of differentiated value (dδf/dt) is equal to or less than the predetermined value (Kd), the program proceeds to Step 405 where it is determined if the timer (Ts) is zero (0). When the timer (Ts) is equal to or less than zero, the program proceeds to Step 406, where the turning flag Fs is reset to be zero (0), and the program returns to the routine in FIG. 6. When the timer (Ts) is not equal to nor less than zero, the program proceeds to Step 407 where the timer (Ts) decrements (Ts−1), and returns to the routine in FIG. 6.

Accordingly, by employing the delay time (Td), the noise, which is caused by the repetition of pressurizing condition and non-pressurizing condition when the automatically pressurizing control is performed, can be reduced, and the vacuum consumption can be reduced. In addition, the delay time (Td) for use in the delay control is appropriately modified in accordance with a tendency of initiating the automatically pressurizing control, by setting the delay time (Td) to be long in the case where the automatically pressurizing control is likely to be initiated, and otherwise setting it to be short.

According to the present embodiment, although the vacuum booster VB was used for the boosting device in the automatic hydraulic pressure generating apparatus, a hydraulic boosting device may be used. Furthermore, the automatic hydraulic pressure generating apparatus may be constituted by an accumulator for accumulating the pressurized brake fluid, and the like.

Figure 8:
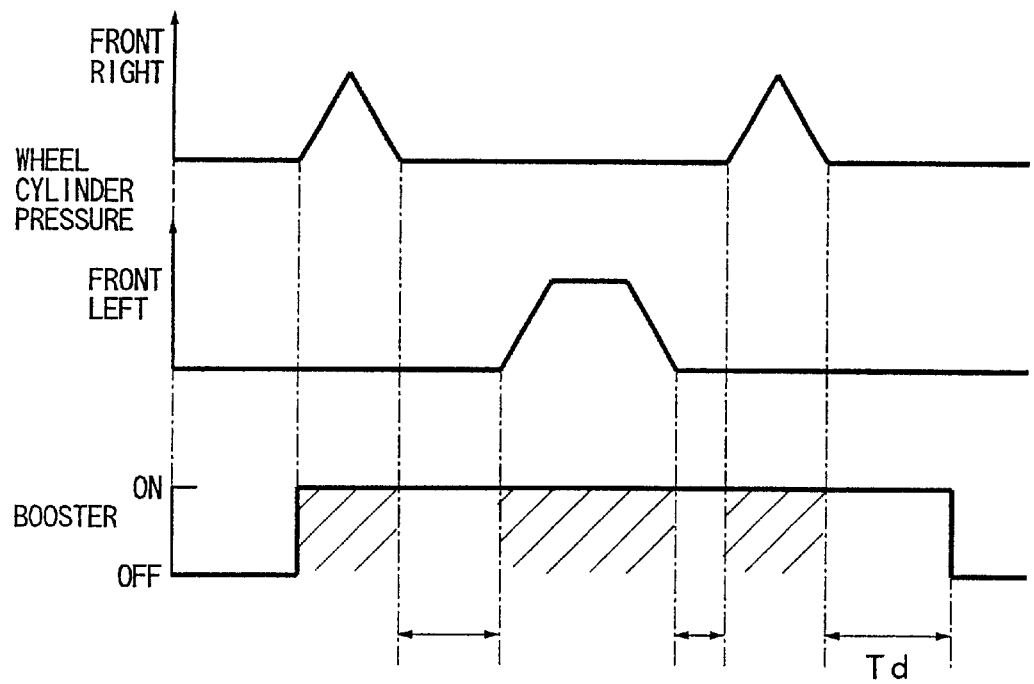
FIG. 8 is a diagram showing an example of setting a delay time (Td) for a steering control by braking performed by a braking apparatus using a vacuum booster according to another embodiment of the present invention.
Figure 9:
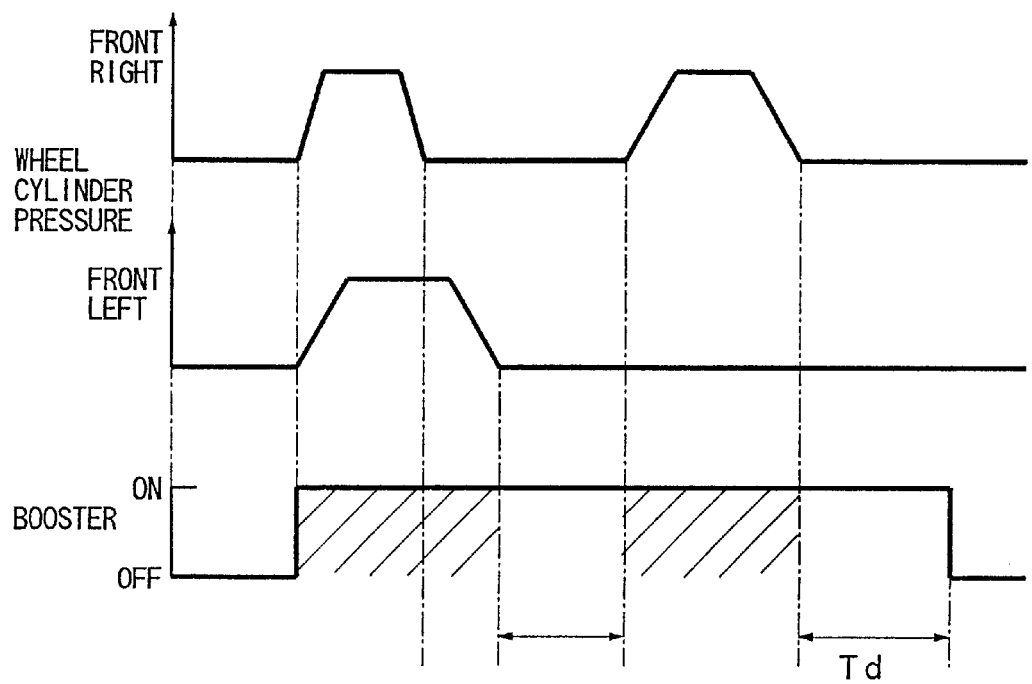
FIG. 9 is a diagram showing an example of setting a delay time (Td) for a traction control performed by a braking apparatus using a vacuum booster according to another embodiment of the present invention.

Next, referring to FIGS. 5, 8 and 9, will be explained another embodiment of the present invention. In FIG. 5, the delay time (Td) is set as shown in FIGS. 8 and 9. FIG. 8 illustrates an example of setting the delay time (Td) for the steering control by braking, wherein when at least one of the front right wheel Wfr and front left wheel Wfl is under control, the vacuum booster VB is maintained to be operative (as indicated by "ON" in FIG. 8) by means of the booster driving device BD, for a period of the delay time (Td) after the pressure control for both of the wheels were terminated. Consequently, the number of operation and non-operation of the vacuum booster VB is reduced, whereby the operating noise is reduced and the vacuum consumption is reduced.

FIG. 9 illustrates an example of setting the delay time (Td) for the traction control, wherein when at least one of the front right wheel Wfr and front left wheel Wfl is under control, the vacuum booster VB is maintained to be operative (as indicated by "ON" in FIG. 9) by means of the booster driving device BD for the period of the delay time (Td) after the pressure control for both of the wheels were terminated. In this example, therefore, the number of operation and non-operation of the vacuum booster VB is reduced, whereby the operating noise is reduced and the vacuum consumption is reduced.

Accordingly, when the program proceeds from Step 109 to Step 119 in FIG. 4 to terminate the automatically pressurizing control, the delay time (Td) is set at Step 201 as shown in FIG. 8 or FIG. 9. Then, after the automatically pressurizing control was terminated, it is determined at Step 202 whether the delay time (Td) has elapsed or not. If it is determined that the delay time (Td) has not elapsed, the program further proceeds to Step 203, where the accelerated amount (e.g., acceleration angle) is compared with the predetermined value (Ka). When it is determined that the accelerated amount is equal to or greater than the predetermined value (Ka), i.e., when it is determined that the accelerator pedal AP is being depressed, the program further proceeds to Step 204, where it is determined whether the brake switch BS is on or off. If the brake switch BS is off, the program further proceeds to Step 205 where the booster driving device BD is actuated, and all of the wheels are set for the hold mode at Step 206. That is, all of the normally-open solenoid valves PC1–PC4 are closed, to shut off the communication between the master cylinder MC and all of the wheel brake cylinders. With respect to the accelerated amount used at Step 203, the depressed amount or depressed speed of the accelerator pedal AP can be used, so that the operated amount or operated speed of the accelerator pedal AP may be detected directly. However, the throttle angle can be detected by the throttle sensor SS, so that the accelerated amount of the accelerator pedal AP may be estimated on the basis of the detected throttle angle.

On the contrary, if it is determined that the delay time (Td) has elapsed at Step 202, the program proceeds to Step 207, where the booster driving device BD is made to be inoperative, and the pressure increase mode is set for all of the wheels at Step 208. Thus, by employing the delay time Td, the number of operation and non-operation of the vacuum booster VB is reduced, thereby to reduce the noise which is caused by a repetition of pressurizing condition and non-pressurizing condition when the automatically pressurizing control is performed, and reduce the vacuum consumption.

Also, when it is determined at Step 203 that the accelerated amount is less than the predetermined value (Ka), i.e., it is determined that the accelerator pedal AP is not depressed, the program proceeds to Step 207, where the booster driving device BD is made to be inoperative, and the pressure increase mode is set for all of the wheels at Step 208. Thus, even if the delay time (Td) has not elapsed, when it is determined that the accelerator pedal AP is not depressed, the booster driving device BD is made to be inoperative, and the pressure increase mode is set for all of the wheels. Consequently, when the braking operation is made during the automatic pressure increasing operation, the ordinary braking operation can be initiated immediately.

Furthermore, when it is determined that the brake switch BS is turned on, i.e., it is determined that the brake pedal BP is depressed at Step 204, the program proceeds to Step 207, where the booster driving device BD is made to be inoperative, and the pressure increase mode is set for all of the wheels at Step 208. Thus, even if the delay time (Td) has not elapsed, when it is determined that the brake pedal BP is depressed, the booster driving device BD is made to be inoperative, and the pressure increase mode is set for all of the wheels, whereby the ordinary braking operation can be initiated immediately.

As described above, even if the delay time (Td) has not elapsed, when it is determined that the accelerated amount is less than the predetermined value (Ka), so that it is determined that the accelerator pedal AP is not depressed, or when it is determined that the brake switch BS is turned on, so that it is determined that the brake pedal BP is depressed, then the booster driving device BD is made to be inoperative, and the pressure increase mode is set for all of the wheels. By employing the delay time (Td), therefore, the noise which is caused by a repetition of pressurizing condition and non-pressurizing condition when the automatically pressurizing control is performed, can be reduced, and the vacuum consumption can be reduced. In addition, even if the delay time (Td) has not elapsed, when the accelerated amount is less than the predetermined value (Ka), the booster driving device BD is not operated, and the pressure increase mode is set for all of the wheels, so that when the braking operation is made, it can be shifted to the ordinary braking operation immediately. Furthermore, even if the delay time (Td) has not elapsed, when it is determined that the brake switch BS is turned on, the booster driving device BD is made to be inoperative, and the pressure increase mode is set for all of the wheels, so that the braking operation can be immediately shifted into the ordinary braking operation.

According to the embodiments as described above, it is so constituted that only when both of the conditions as defined in Steps 203 and 204 are fulfilled, the program proceeds to Step 205. However, it may be so constituted that when only one of them is fulfilled, the program proceeds to Step 205, and when one of them is not fulfilled, the program proceeds to Step 207.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. A vehicle motion control system comprising:
   wheel brake cylinders operatively associated with wheels of said vehicle, respectively;
   automatic hydraulic pressure generating means for generating a hydraulic braking pressure irrespective of operation of a brake pedal;
   hydraulic pressure control valve means disposed between said pressure generating means and said wheel brake cylinders to control the hydraulic braking pressure in each wheel brake cylinder;
   control means for controlling said pressure generating means and said valve means in response to conditions of motion of said vehicle, and performing an automatically pressurizing control to said wheel brake cylinders at least when a brake pedal is not depressed, to perform a vehicle motion control, said control means maintaining said pressure generating means to operate for a predetermined time period after the vehicle motion control was terminated, and controlling said valve means to shut off the communication between said pressure generating means and said wheel brake cylinders, to modify the time period on the basis of the conditions of motion of said vehicle.

2. A vehicle motion control system as set forth in claim 1, further comprising acceleration detection means for detecting an accelerating condition of said vehicle, wherein said control means modifies the time period at least on the basis of the result detected by said acceleration detection means.

3. A vehicle motion control system as set forth in claim 2, wherein said acceleration detection means includes an acceleration sensor for detecting operation of an accelerator pedal mounted on said vehicle.

4. A vehicle motion control system as set forth in claim 2, wherein said acceleration detection means includes a throttle sensor for detecting an opening angle of a throttle valve disposed in an engine of said vehicle, and estimates the operation of said accelerator pedal on the basis of the opening angle detected by said throttle sensor.

5. A vehicle motion control system as set forth in claim 1, further comprising turning condition detection means for detecting a turning condition of said vehicle, wherein said control means modifies the time period at least on the basis of the turning condition detected by said turning condition detection means.

6. A vehicle motion control system as set forth in claim 5, wherein said turning condition detection means includes at least one of a steering angle sensor for detecting a steering angle of front wheels, a lateral acceleration sensor for detecting a lateral acceleration of said vehicle and a yaw rate sensor for detecting a yaw rate of said vehicle, and determines the turning condition of said vehicle on the basis of the result detected by at least one of said sensors.

7. A vehicle motion control system as set forth in claim 1, further comprising vacuum detection means for detecting intake vacuum of an engine mounted on said vehicle, wherein said control means modifies the time period at least on the basis of the intake vacuum detected by said vacuum detection means.

8. A vehicle motion control system as set forth in claim 7, wherein said vacuum detection means includes at least one of a vehicle speed sensor for detecting a speed of said vehicle, wheel speed sensors for detecting speeds of said wheels and a rotational speed sensor for detecting a rotational speed of said engine, and estimates the intake vacuum on the basis of the result detected by at least one of said sensors.

9. A vehicle motion control system comprising:
wheel brake cylinders operatively associated with wheels of said vehicle, respectively;
automatic hydraulic pressure generating means for generating a hydraulic braking pressure irrespective of operation of a brake pedal;
hydraulic pressure control valve means disposed between said pressure generating means and said wheel brake cylinders to control the hydraulic braking pressure in each wheel brake cylinder;
acceleration detection means for detecting an accelerating condition of said vehicle;
braking operation detection means for detecting a braking operation of said vehicle;
control means for controlling said pressure generating means and said valve means in response to conditions of motion of said vehicle, and performing an automatically pressurizing control to said wheel brake cylinders at least when a brake pedal is not depressed, to perform a vehicle motion control, said control means maintaining said pressure generating means to operate for a predetermined time period after the vehicle motion control was terminated, and controlling said valve means to shut off the communication between said pressure generating means and said wheel brake cylinders, and said control means controlling said pressure generating means to be in an inoperative condition thereof and controlling said valve means to release the shut-off condition between said pressure generating means and said wheel brake cylinders, in response to a result detected by at least one of said acceleration detection means and said braking operation detection means.

10. A vehicle motion control system as set forth in claim 9, wherein said control means makes said pressure generating means to be in an operative condition thereof, and controls said valve means to shut off the communication between said pressure generating means and said wheel brake cylinders, when said acceleration detection means has detected the acceleration during the predetermined time period after the vehicle motion control was terminated, and wherein said control means makes said pressure generating means to be in an inoperative condition thereof, and controls said valve means to release the shut-off condition between said pressure generating means and said wheel brake cylinders, when said acceleration detection means has not detected the acceleration during the predetermined time period after the vehicle motion control was terminated.

11. A vehicle motion control system as set forth in claim 10, wherein said acceleration detection means includes an acceleration sensor for detecting operation of an accelerator pedal mounted on said vehicle.

12. A vehicle motion control system as set forth in claim 10, wherein said acceleration detection means includes a throttle sensor for detecting an opening angle of a throttle valve disposed in an engine of said vehicle, and estimates the operation of said accelerator pedal on the basis of the opening angle detected by said throttle sensor.

13. A vehicle motion control system as set forth in claim 9, wherein said control means makes said pressure generating means to be in an operative condition thereof, and controls said valve means to shut off the communication between said pressure generating means and said wheel brake cylinders, when said braking operation detection means has not detected the braking operation during the predetermined time period after the vehicle motion control was terminated, and wherein said control means makes said pressure generating means to be in an inoperative condition thereof, and controls said valve means to release the shut-off condition between said pressure generating means and said wheel brake cylinders, when said braking operation detection means has detected the braking operation during the predetermined time period after the vehicle motion control was terminated.

14. A vehicle motion control system as set forth in claim 13, wherein said braking operation detection means includes a brake switch turned on and off in response to operation of said brake pedal.

* * * * *